(12) United States Patent
Hekstra et al.

(10) Patent No.: US 6,212,662 B1
(45) Date of Patent: Apr. 3, 2001

(54) METHOD AND DEVICES FOR THE TRANSMISSION OF DATA WITH TRANSMISSION ERROR CHECKING

(75) Inventors: Andries Pieter Hekstra, Voorschoten; José Manuel Herrera Van Der Nood, Rotterdam, both of (NL)

(73) Assignee: Koninklijke Kpn N.V., Groningen (NL)

(*) Notice: Subject to any disclaimer, the term of this patent is extended or adjusted under 35 U.S.C. 154(b) by 0 days.

(21) Appl. No.: 09/360,632

(22) Filed: Jul. 26, 1999

Related U.S. Application Data

(62) Division of application No. 08/670,574, filed on Jun. 26, 1996, now Pat. No. 5,978,959.

(51) Int. Cl.[7] ............................ G06F 11/00; H03M 13/00
(52) U.S. Cl. ............................................ 714/778; 714/702
(58) Field of Search ..................................... 714/778, 766, 714/752, 702, 701, 761, 756, 755; 380/2, 9, 30, 36

(56) References Cited

U.S. PATENT DOCUMENTS

| | | | |
|---|---|---|---|
| 4,304,961 | * 12/1981 | Campbell, Jr. | 713/170 |
| 4,461,001 | * 7/1984 | Bossenet et al. | 714/419 |
| 4,916,702 | * 4/1990 | Berlekamp | 714/702 |
| 4,929,946 | 5/1990 | O'Brien et al. | 341/87 |
| 4,941,144 | 7/1990 | Mizukami | 714/708 |
| 4,961,192 | 10/1990 | Grimes | 714/778 |
| 5,003,539 | 3/1991 | Takemoto et al. | 714/785 |
| 5,068,854 | 11/1991 | Chandran et al. | 714/776 |
| 5,319,712 | 6/1994 | Finkelstein et al. | 380/44 |
| 5,321,754 | 6/1994 | Fisher et al. | 380/268 |
| 5,420,928 | 5/1995 | Aiello et al. | 380/46 |
| 5,432,848 | * 7/1995 | Butter et al. | 380/2 |
| 5,535,227 | * 7/1996 | Silvano | 714/766 |
| 5,537,427 | * 7/1996 | Chen | 714/781 |
| 5,799,088 | * 8/1998 | Raike | 380/30 |

FOREIGN PATENT DOCUMENTS

| | | |
|---|---|---|
| 0 188 271 | 7/1986 | (EP) . |
| 0 242 595 | 10/1987 | (EP) . |
| 0 423 485 A1 | 9/1990 | (EP) . |
| 0 494 036 A2 | 7/1992 | (EP) . |
| WO 87/03442 | 6/1987 | (WO) . |

OTHER PUBLICATIONS

Hugo Krawczyk, "LFSR–Based Hashing and Authentication", Advances in Cryptology—Crypto '94, 14th Annual International Cryptology Conference Proceeding, Santa Barbara, California, (pp. 129–139), Aug. 21–25, 1994.

Fritz Bauspiess, et al. "Requirements for Cryptographic Hash Functions", Computers & Security (pp. 427–437), No. 5, Sep. 1992, Oxford, GB.

* cited by examiner

*Primary Examiner*—Albert Decady
*Assistant Examiner*—Shelly A Chase
(74) *Attorney, Agent, or Firm*—Oblon, Spivak, McClelland, Maier & Neustadt, P.C.

(57) ABSTRACT

The invention concerns a method and devices for the detection of errors, in particular transmission errors, in data streams and/or data packets. In order to better detect systematic errors in particular, the error detection function according to the invention is variable. The detection function is varied on the basis of the time and/or the data themselves, for example by assigning an individual variation value to each index (packet index), effectively varying the data themselves. The invention is particularly suitable for application to compressed data streams.

4 Claims, 3 Drawing Sheets

METHOD AND DEVICES FOR THE TRANSMISSION OF DATA WITH TRANSMISSION ERROR CHECKING

Figure 1:
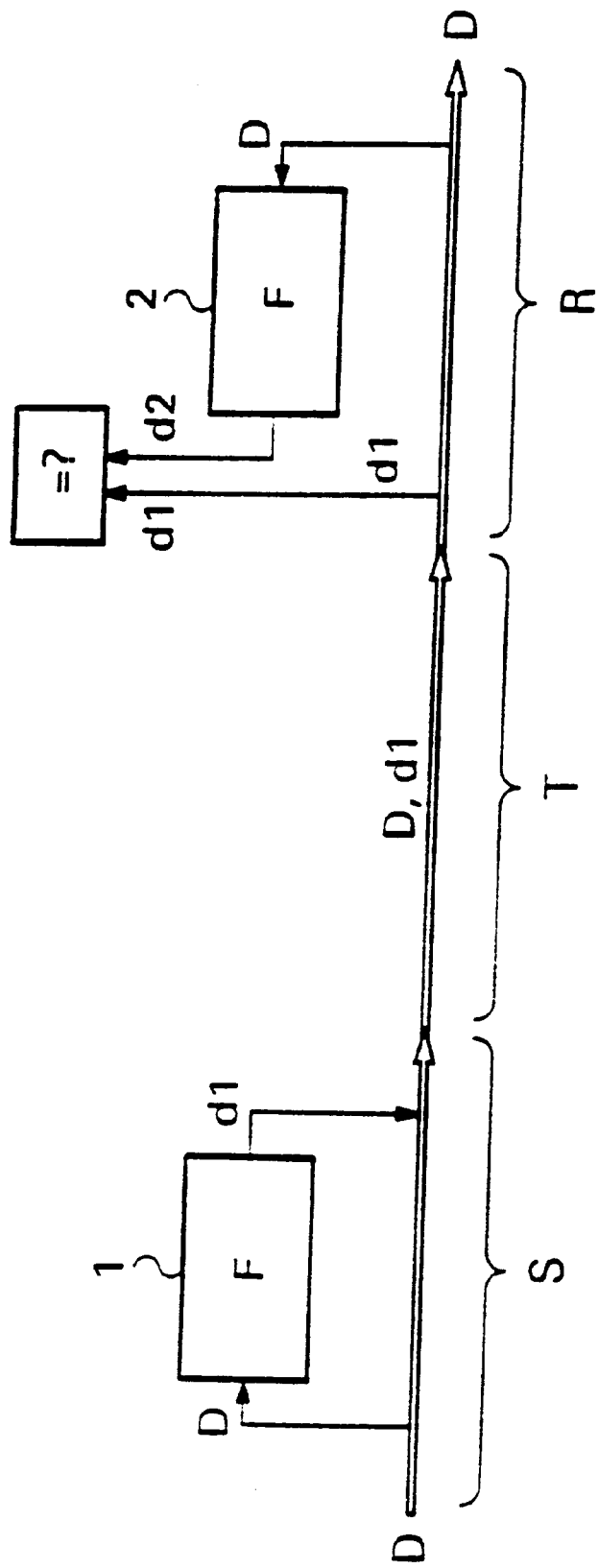

This application is a division of application Ser. No. 08/670,514 filed Jun. 26, 1996, now U.S. Pat. No. 5,978,959.

BACKGROUND OF THE INVENTION

Field of the Invention

The invention relates to a method for the transmission of data with transmission error checking. More in particular, the invention is related to a method for the transmission of data between a transmitting end and a receiving end of a transmission channel, involving the generation of supplementary data at the transmitting and the receiving end by a first and a second function respectively, and the comparison of the supplementary data generated by said functions in order to detect transmission errors. The invention further relates to devices for the application of such a method.

A method and devices of the above-mentioned kind are known in the prior art. In this connection, the transmission channel can be set up for transmission in space (bridging a distance) as well as for transmission in time (storage and display). Further, the second function can be implemented in such a manner that it is, for example, an inverse of the first function, so that the original data are reconstructed. This allows the original data, rather than the supplementary data, to be compared. Reference is made to European Patent Application 0,494,036 and U.S. Pat. No. 4,961,192.

Transmission errors may arise, for example, through electromagnetic radiation, inadequacies in a storage medium (transmission in time), and errors in switching and transmission equipment. Prior art methods provide for the checking of transmitted (user) data by the addition of supplementary data which, as redundant information, enable the detection of transmission errors to a certain degree. As an example of such supplementary data, so-called parity bits, which at the transmitting end can be added to binary data by a first function and, for example, represent the number of ones and zeroes, can be mentioned. At the receiving end it can be checked whether this number of ones and zeros, as represented by the parity bits, corresponds with the data received. If the parity bits do not correspond with the data received, a transmission error has apparently occurred and the data concerned could be transmitted again if necessary.

In prior art methods the problem arises that systematic errors are sometimes not detected. Systematic errors, that is to say, errors which repeat themselves, can arise inter alla through an error which repeats itself in the transmission channel (for example an interference signal with a certain frequency) or through an equipment error. For (binary) data it holds that there is always a probability that erroneous data are considered to be correct data because the supplementary data may be correct by coincidence (the supplementary data are always restricted in length and therefore a finite number of supplementary data can be distinguished). With systematic errors the case may therefore arise that an error once not recognized as such, is continually not detected.

International Patent Application WO87/03442 discloses a data encryption device comprising a CRC (Cyclic Redundancy Code) generator. A counter produces count bits related to the data. The CRC generator computes a CRC on the basis of the encrypted data to which the count bits are appended. Although the appending of count bits provides an improved protection against systematic errors, such errors can still not be excluded as the data proper are not altered.

The non-detection of a transmission error in the data can make itself felt in the rest of the data received. This is especially the case if, on the transmission path, the data is compressed or otherwise encoded. In the decoding process, not only the erroneous data, but in some cases all following data may become unusable, in particular if the statistics by means of which the compression and decompression take place are affected by the erroneous data.

The ITU-standard V.42 bis describes, for example, an adaptive compression scheme which, during the compression, records statistics of the data to be compressed. If systematic errors are not detected, the said statistics no longer correspond with the data, so that at the receiving end an incorrect decompression takes place. This may result in all decompressed data becoming unusable.

SUMMARY OF THE INVENTION

An object of the invention is to deal with the above-mentioned and other disadvantages of the prior art, and to provide a method which allows data to be checked for errors in a better way, and thus considerably increases the probability of transmission errors being detected. A further object of the invention is to provide a method which is particularly suitable for application to compressed data and which can be applied in a simple manner.

These and other objects are met in accordance with the invention by a method for the transmission of data between a transmitting end and a receiving end of a transmission channel while providing an error check, said method comprising the steps of: generating, at the transmitting end, supplementary data on the basis of original data by means of a first function, said first function varying said original data in time; transmitting both the original data and the supplementary data over a transmission path; regenerating, at the receiving end, supplementary data on the basis of the reprocessed transmitted data by means of a second function, said second function varying said original data in time; and checking the transmitted data by comparing the regenerated supplementary data with the transmitted supplementary data.

In this way it is achieved that the detection probability of systematic errors in particular increases considerably, since (erroneous) data are always varied in time, and are thus effectively checked by a different function each time. The probability that an error, once not recognized as such, is continually not detected, has hereby become minimal.

The invention is therefore based on the insight that an error which repeats itself, once not detected by a normal (fixed) checking function, will repeatedly go undetected. The invention is also based on the insight that a variable checking function can almost always prevent the non-detection of repetitive errors. A further aspect of the invention is based on the insight that the varying of the checking function can be advantageously based on the data to be checked, and that the varying of the data can be used to accomplish a varying, i.e. time-dependent checking function. A further insight which is of importance for the invention is that between the transmitter and receiving end a form of synchronization must exist, in other words that the relationship between user data and supplementary data must be maintained.

The said functions, that is to say the first and the second function, are used for the creation of supplementary data at the transmitting end (first function) and the creation also of supplementary data at the receiving end (second function), after which the supplementary data generated by the two functions are compared. In principle, the two functions should be identical or should provide identical results for identical data. In some cases the second function may not be identical to the first, but may, for example, be formed by its inverse. The second function may be of the kind which is referred to as parity check function.

A function can be varied as a whole, for example by continually applying another function from a group of functions. Preferably, however, a function comprises a first and a second part, of which only the second part is varied. In this case, the first part can consist of the function proper, which can be invariable, the second part being a value which is varied, preferably under influence of the data. The functions can thus, if the data are transmitted in a bit stream, be varied every n bits, where $n \geq 1$. If the data are transmitted in data packets, the functions can be varied on the basis of one or more parameters of the data packets. As a matter of fact, the term "data packets" is here also taken to mean frames, containers and other data structures. The said parameters can comprise an index, time indication or a channel number.

EXEMPLARY EMBODIMENTS

The invention will be explained in greater detail by reference to the figures.

FIG. 1 diagrammatically shows the principle of data transmission according to the prior art.

Figure 2:
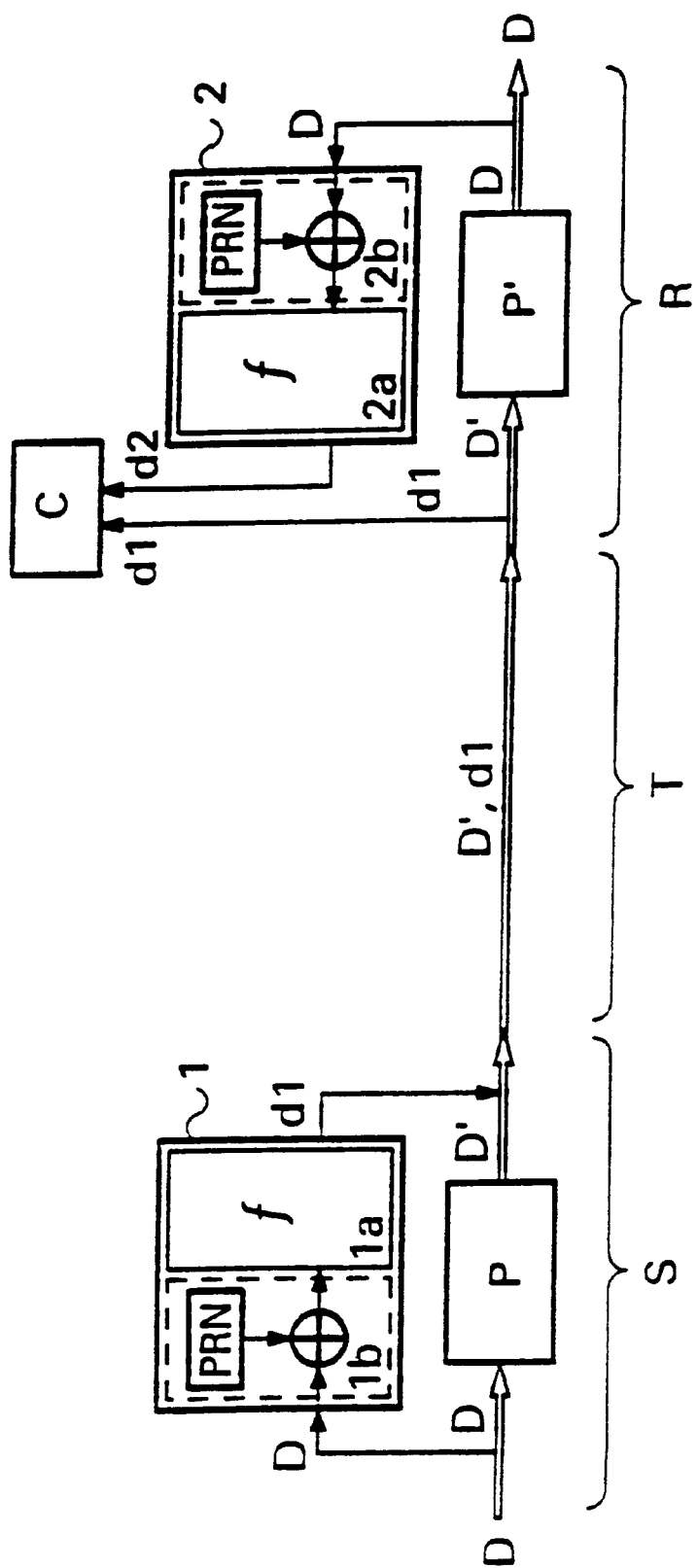

FIG. 2 diagrammatically shows a first embodiment of the method according to the invention.

Figure 3:
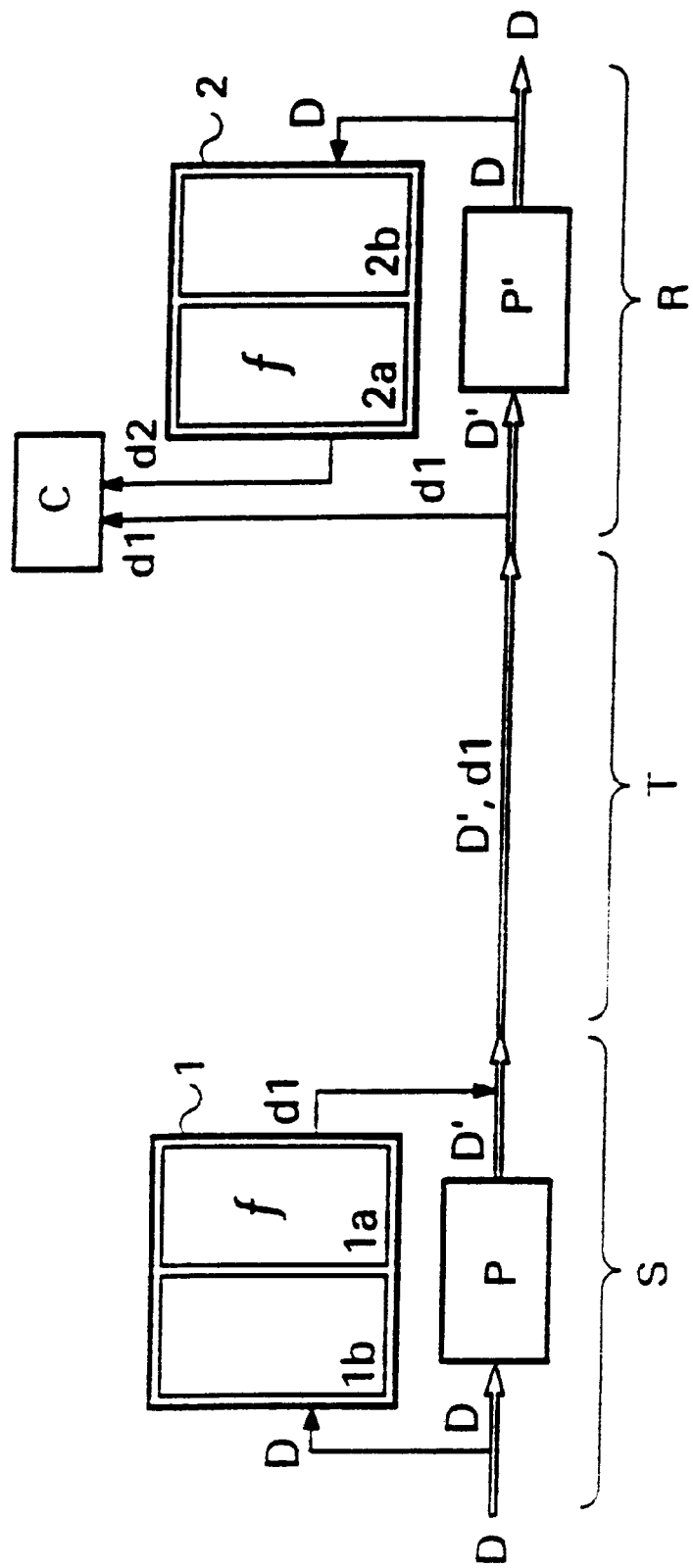

FIG. 3 diagrammatically shows a second embodiment of the method according to the invention.

As diagrammatically shown in FIG. 1, supplementary or check data d1 are generated on the basis of (user) data D by a first function 1. Subsequently the original data D, like the supplementary data d1, are transmitted over the transmission path T from the transmitting or sending end S to the receiving end R. At the receiving end R, supplementary or check data d2 are generated by a second function 2, which preferably is identical to the first function 1. The supplementary data d2 so generated are compared with the transmitted supplementary data d1. If the supplementary data d1 and d2 are equal, the transmission has apparently taken place without errors. If the supplementary data d1 and d2 are not equal, then a transmission error has occurred and in many cases a re-transmission of the data concerned will be requested.

The supplementary data d1 have a size which inter alia can be dependent upon the capacity of the transmission path and the probability of transmission errors. For a size of r bits, $2^r$ different supplementary data d1 and d2 respectively are possible. Erroneous data can therefore result in correct data d2 with a probability of $2^{-r}$ (or less). If erroneous data repeat themselves and are once found to be correct, prior art methods will always consider these erroneous data to be correct. The invention seeks to provide a solution in this regard.

As is shown in FIG. 2 by way of example, functions 1 and 2 can consist of a fixed and a variable part, the variable part being a variation value. At the transmitting end S, the (first) function 1 consists of a function part 1a, which generates supplementary data d1, and a function part 1b, which varies the data which are to be checked. Likewise, at the receiving end R the (second) function 2 comprises a first function part 2a, which generates supplementary data d2, and a function part 2b, which varies the data which are to be checked.

In the example shown, the function part 1b comprises an adder and a random number generator (PRN). The adder is preferably an EXOR adder, which adds random numbers to the user data. The result of this addition is supplied to the function part 1a, which in this example is fixed but may also be variably implemented. Likewise, the function part 2b comprises an adder and a random number generator, which can be completely identical to those of the function part 1b. At the receiving end, a comparator C, which compares the supplementary data d1 and d2, is further included. It will be understood that the functions described here can be implemented in software as well as in hardware (for example as an ASIC).

In the example described above, the functions 1 and 2 can be thought of as consisting of a fixed part (1a and 2a respectively) and a variable part (1b and 2b respectively). The variable part is variable to the extent that another, in principle unknown, variation value, namely a random number, is continually conjoined with the data, in particular added or interwoven. The variable element, which varies the behaviour of the function, is thus formed by the random number. Reference to FIG. 2 will make clear that the so-called variable function on the one hand, and a fixed function of which the input data are varied on the other hand, produce similar results.

The supplementary data d1, which are generated by the (first) function 1, are transmitted via the transmission path. In the example shown, the user data D are processed (encoded) by a process P which, for example, can be a data compression process, so that processed data D' are transmitted over the transmission path. The function P' at the receiving end can, for example, comprise the inverse function of P. In accordance with European Patent Application 0,718,999 (published Jun. 26, 1996 and corresponding with U.S. patent application Ser. No. 08/569,922 filed Dec. 8, 1995, herewith incorporated by reference in this text), the supplementary data in the example of FIG. 2 are formed on the basis of the unprocessed (that is to say, not encoded by the process P) user data D, that is to say, the user data not encoded by the process P. It will be understood, however, that the supplementary data can also be formed on the basis of the processed (that is to say, encoded) data D', and that the process P will be omitted in some applications. Apart from that, the process P can result in a so-called non-systematic code (by means of a matrix multiplication, for example), in which case the transmitted supplementary data d1 are not readily separable from the user data D'.

The random number generator, which itself can be a (pseudo) random number generator known in the prior art, supplies random numbers consisting of one or more bits. Dependent upon the time, but preferably dependent upon the user data D (or D'), a new random number is continually generated. If the user data are formed by a bit stream, then for each bit of the user data, for example, or for every n bits, a new random number (in general: a new variation value) can be generated ("bit-index": the data stream bits function as parameters on the basis of which the varying takes place). It is also possible to vary the function completely for every n bits ($n \geq 1$) by loading a new algorithm (function f), for example, in the "fixed" part 1a (and 2a respectively). The variable part 1b (and 2b respectively) can be omitted in the latter case.

If the user data D are transmitted in the form of data packets (in which frames, containers, cells and such are included), the variation value can advantageously be determined by a data packet index. Such an index may consist, for example, of the channel number, a sequence number, a time indication, and so on. In this connection, the index can be used directly as variation value (thus in the example of FIG.

2 by supplying the index instead of a random number to the adder), or indirectly. In the latter case, the index may be used, for example, as the starting value of a random number generator, but also as the address of a list (stored in a memory) of variation values which were possibly generated earlier by a random number generator. Besides an increase in speed, the use of a list offers the advantage of a larger range: an index of, for example, four bits can address sixteen memory locations, which could each contain a variation value of, for example, 32 bits. According to a still further aspect of the invention, the variation value (or the functions, respectively) is, on the contrary, not changed if the index is changed, since a modified index (such as the channel number) indicates modified data. As a result, a further speed advantage can be gained.

In order to synchronize the first and second function at the transmitter and receiving ends respectively, the supplementary data can advantageously be accommodated at a fixed place in a data block, in which case such a data block can also consist of a number of data packets or other data structures. Accommodating at a fixed place simplifies the recognition of the supplementary data and, with that, the synchronization, that is to say, the relationship between user data and supplementary data. In particular, if the user data have been processed (for example compressed), the built-in synchronization monitoring which is included in most communication protocols can be used with advantage. Further, the (standard) re-transmission protocol for re-establishing synchronization can be employed, as can the synchronization required for the multiplexing and de-multiplexing of the supplementary data.

As explained above with reference to FIG. 2, the probability of repetitions in the data, and with that the probability of repetitive non-detection of errors, is considerably reduced by the addition of (pseudo) random numbers to the (either processed or non-processed) user data. In the example of FIG. 2, the function 1$b$, like the function 2$b$ at the receiving end R, is preferably non-linear. By using a non-linear function, the probability of repetitive non-detection of errors is further reduced.

A non-linear function can be achieved by means of a so-called S-box, known in the art of cryptography. Input data are supplied to the first input of the S-box, which can be formed by a memory filled with random numbers. These input data are also supplied to an adder, which is connected to the output of the S-box. A permutation is performed on the output data of the adder, after which these data are supplied to the second input of the S-box via a time delay. The addressing of the memory of the S-box thus takes place on the basis of data which consist partly of the original input data and partly of the time-delayed feedback data. The data thus resulting from the permutation are dependent upon the input data in a non-linear manner.

In FIG. 3, a second exemplary embodiment of the invention is diagrammatically shown. The function 1 at the transmitting end S can again consist of a fixed part 1$a$ and a variable part 1$b$. The fixed part 1$a$ can correspond completely with that of FIG. 2. In the example of FIG. 3, the variable part 1$b$, which brings about a variation in the data, comprises a permutation of the data D. In this connection, bit positions within a data block are interchanged, for example as follows: bit 1 to position 2, bit 2 to position 4, bit 3 to position 1 and bit 4 to position 3. A bit string represented by ABCD thus has the sequence CADB after one permutation, the sequence DCBA after two permutations, and so on. As variation value in this embodiment, the permutation can be used: different permutations can be read out from a table, and be varied on the basis of the data (number of bits, index, etc., see above). Advantageously, the permutations can be repeatedly applied, for example by continually reperforming each permutation on itself. The said permutations can be applied to a data block or to a part of a data block. Within relatively long data packets, it may be advantageous to apply a permutation to a part of the packet repetitively. In this case either the same or another permutation can be used for each data block (packet part).

Because in the embodiment of FIG. 3 permutations are applied to the data, the requirements for the functions 1 and 2 can be less stringent. In the case of FIG. 3, for instance, linear functions will suffice.

In the embodiment of FIG. 3, the function units 1 and 2 may each comprise a microprocessor and suitable memory means. In the memory means, suitable software programs for performing the permutations and for performing the actual function f may be stored. An additional memory may optionally be provided for storing a permutation table. Alternatively, the permutations and/or the functions f may be implemented in hardware, e.g. in an application-specific integrated circuit (ASIC). The comparator C may be implemented as a hardware component or, alternatively, as software, e.g. running on the processor of function unit 2. It will be understood that the embodiment of FIG. 2 may be implemented in a similar way, the permutation being replaced by a random number generator and an EXOR-adder. Both the random number generator and the adder may be implemented in hardware or in software.

The embodiments of the invention shown above provide a reliable check on the transmitted data. Error patterns which, in combination with data, result in erroneous data which are not recognized as such by conventional means, can also be detected by the method according to the invention.

In general, a re-transmission of (a block of) data is requested if an error is detected. According to a further aspect of the invention, the same state of the functions is used during the retransmission, since the functions have detected an error in their respective state. In other words, on re-transmission the functions are preferably not varied with respect to their state during the detection of a transmission error. If required, the said state (variation values or the function itself) can, to this end, be stored in a special memory to be used again on receiving the re-transmission involved.

In the above, it was continually described how transmitted data are checked on the basis of supplementary data. Instead of, or in addition to, checking the data themselves, it is also possible to check values which are dependent upon the data, such as tables in data compression and decompression processes. In this connection, the error propagation as a result of the influencing of data statistics can be reduced by loading the (new) statistics in the decoding or encoding unit only after these have been checked and found to be correct (stepwise adaptive coding).

As a further check on transmission errors with compressed data which are transmitted in data packets, a check can be performed which takes the length of the packets into account. A packet which, after compression or decompression, is longer than normal (where "normal" can be determined on the basis of statistics or on the basis of separately transmitted length data), can then be considered to be incorrect.

It will be understood by those skilled in the art that the invention is not limited to the embodiments shown, and that many modifications and additions are possible without departing from the scope of the invention.

What is claimed is:

1. A device for producing error checking based on original data provided in blocks with each block having plural bits in a particular ordered sequence, comprising:

a generating device configured to generate check data; and a varying device configured to vary original data prior to supplying said original data to the generating device as varied data;

wherein said varying device includes a permutating device configured to perform a permutation of bit position relative to said particular ordered sequence for at least some of the bits in each of said blocks making up said original data without reordering any blocks of original data.

2. The device according to claim 1, wherein the varying device is further configured to modify the permutation in time.

3. The device according to claim 2, wherein the varying is further configured to modify the permutation based on the original data.

4. The device according to claim 3, wherein the permutating device includes a table in which subsequent permutations are stored.

* * * * *

UNITED STATES PATENT AND TRADEMARK OFFICE
CERTIFICATE OF CORRECTION

| | |
|---|---|
| PATENT NO. | : 6,212,662 B1 |
| DATED | : April 3, 2001 |
| INVENTOR(S) | : Andries Pieter Hekstra, et al. |

It is certified that error appears in the above-identified patent and that said Letters Patent is hereby corrected as shown below:

Title page,
Item [30], the Foreign Application Priority Data. Item [30] should read as follows:

-- [30]    Foreign Application Priority Data

Jun. 26, 1995   (NL) ..................... 1000669 --

Column 1,
First paragraph, the Related Application Data should read:

-- This application is a division of application Ser. No. 08/670,574 filed Jun. 26, 1996, now U.S. Pat. No. 5,978,959. --

Signed and Sealed this

Twenty-third Day of October, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO.   : 6,212,662 B1
DATED        : April 3, 2001
INVENTOR(S)  : Andries Pieter Hekstra et al.

It is certified that error appears in the above-identified patent and that said Letters Patent is hereby corrected as shown below:

Column 1,
Line 49, please change "alla" to -- alia --;
Line 50, please insert -- , -- between "error" and "which".

Column 3,
Line 47, please change "alla" to -- alia --.

Column 4,
Line 33, please change "patent" to -- Patent --; same line, please
Change "application" to -- Application --.

Signed and Sealed this

Twentieth Day of November, 2001

Attest:

NICHOLAS P. GODICI
*Attesting Officer*     *Acting Director of the United States Patent and Trademark Office*